US 6,599,975 B1

(12) United States Patent
Licht et al.

(10) Patent No.: US 6,599,975 B1
(45) Date of Patent: Jul. 29, 2003

(54) LATENT CROSS-LINKING AQUEOUS DISPERSIONS COMPRISING A POLYURETHANE

(75) Inventors: Ulrike Licht, Mannheim (DE); Karl Häberle, Speyer (DE); Eckehardt Wistuba, Bad Dürkheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/463,668

(22) PCT Filed: Jul. 20, 1998

(86) PCT No.: PCT/EP98/04487

§ 371 (c)(1),
(2), (4) Date: May 1, 2000

(87) PCT Pub. No.: WO99/06460

PCT Pub. Date: Feb. 11, 1999

(30) Foreign Application Priority Data

| Jul. 31, 1997 | (DE) | 197 33 044 |
| Apr. 15, 1998 | (DE) | 198 16 528 |
| Apr. 15, 1998 | (DE) | 198 16 527 |
| Jun. 25, 1998 | (DE) | 198 28 251 |

(51) Int. Cl.[7] .............. C08J 3/00; C08K 3/20; C08L 75/00; B05D 3/02; B32B 27/00
(52) U.S. Cl. .......... 524/591; 427/372.2; 427/385.5; 428/423.1; 524/507; 524/839; 524/840; 525/123; 525/127; 525/130; 525/455
(58) Field of Search ............... 524/507, 591, 524/839, 840; 525/123, 127, 130, 455; 428/423.1; 427/385.5, 372.2

(56) References Cited

U.S. PATENT DOCUMENTS 4,910,339 A  *  3/1990  Henning et al. ............ 564/252

* cited by examiner

*Primary Examiner*—Patrick D. Niland
(74) *Attorney, Agent, or Firm*—Oblon, Spivak, McClelland, Maier & Neustadt, P.C.

(57) ABSTRACT

Latent-crosslinking aqueous polyurethane dispersions comprising

I) a disperse phase (P.I) comprising
  Ia) a polyurethane (Ia) which carries carbodiimide groups in addition to hydrophilic groups which make it dispersible in water but carries essentially no carboxyl groups or
  Ib) a physical mixture of
    Ibi) a polyurethane (Ibi) which carries hydrophilic groups which make it dispersible in water but carries essentially no carbodiimide or carboxyl groups and
    Ibii) a carbodiimide (Ibii) which carries essentially no hydrophilic groups which make it dispersible in water, and
II) a disperse phase (P.II) comprising another polymer (II) which carries carboxyl groups and essentially no carbodiimide groups.

15 Claims, No Drawings

LATENT CROSS-LINKING AQUEOUS DISPERSIONS COMPRISING A POLYURETHANE

1. The present invention related to latent-crosslinking aqueous polyurethane dispersions comprising I) a disperse phase (P.I) comprising
   Ia) a polyurethane (Ia) which carries carbodiimide groups in addition to hydrophilic groups which make it dispersible in water but carries essentially no carboxyl groups or
   Ib) a physical mixture of
      Ibi) a polyurethane (Ibi) which carries hydrophilic groups which make it dispersible in water but carries essentially no carbodiimide or carboxyl groups and
      Ibii) a carbodiimide (Ibii) which carries essentially no hydrophilic groups which make it dispersible in water, and
II) a disperse phase (P.II) comprising another polymer (II) which carries carboxyl groups and essentially no carbodiimide groups.

The invention also relates to the use of the aqueous dispersions of the invention as impregnants, coating compositions or adhesives, and to the impregnated, coated or adhesively bonded articles produced using these dispersions.

Aqueous dispersions comprising a polyurethane in disperse form are common knowledge. In order that coatings prepared from the polyurethane have particularly good mechanical properties, a crosslinking component is added to these dispersions. It is particularly desirable here for the crosslinker to bring about the buildup in molecular weight of the polyurethane only after the polyurethane dispersion, following application to the substrate workpiece, has already formed a film. If this is the case, the resulting films are of particularly high cohesion, since the polymer molecules of a dispersion particle can then be linked to another, adjacent dispersion particle by a covalent bond.

Especially good film cohesion is required in the adhesives sector, for example, when the adhesive bond is subjected simultaneously to heat and mechanical loading.

To obtain adhesive bonds of sufficient strength even under these conditions it has been recommended, for example, in EP-A-206059, to add a water-emulsifiable polyisocyanate as crosslinker to the dispersions shortly before they are processed as adhesives.

The disadvantage of these two-component systems, however, is that the potlife—that is, the period within which these systems can be processed after mixing—is very short. Since the two-component system cannot be stored for prolonged periods and the processor has to prepare an extra amount of adhesive to be processed within one operating cycle, the effort required by the adhesives processor is greater for two-component systems than for one-component systems.

U.S. Pat. Nos. 4,977,219 and 5,117,059 disclose mixtures of an aqueous dispersion of a carbodiimide and of an aqueous dispersion of an emulsion polymer having carboxylate groups, the first-mentioned dispersion being stabilized with the aid of customary surface-active substances.

U.S. Pat. No. 5,574,083 relates to a mixture of an aqueous dispersion of carbodiimides which is stabilized by hydrophilic polyalkylene oxide radicals carried by the carbodiimides. These dispersions are blended with aqueous dispersions of an emulsion polymer having carboxylate groups.

EP-A-792 908 discloses mixtures of an aqueous dispersion of a carboxyl-containing polyurethane and an aqueous dispersion of a carbodiimide, the dispersion being stabilized with the aid of customary surface-active substances.

According to the 4 abovementioned documents, the carbodiimides bring about an increase in the molecular weight of the carboxyl-containing polymers with which they are blended. The strength of bonds produced with these dispersions, however, especially under hot conditions, still leaves something to be desired. In addition, the potlife of such mixtures is limited.

German Patent Application 19733044.4, unpublished at the priority date of the present specification, relates to aqueous dispersions of a polyurethane which carries carbodiimide groups.

It is an object of the present invention to provide a further one-component polyurethane dispersion devoid of the disadvantages of the prior art. In particular, it should have good storage stability and should permit the production of heat-resistant bonds.

We have found that this object is achieved by the aqueous dispersions defined at the outset.

The disperse phase P.I generally contains from 0.01 to 1, preferably from 0.1 to 0.5, and, with particular preference, from 0.15 to 0.4 mol of carbodiimide groups per kg of monomers employed for the synthesis of the polyurethanes Ia or Ibi and Ibii.

Examples of suitable polyurethanes (Ia) are described in EP-A-792908.

Suitable polyurethanes (Ia) are, in principle, all hydrophilic polyurethanes synthesized using monomers having carbodiimide structural units. The carbodiimide structural units are incorporated into the polyurethane (Ia) preferably by way of polyisocyanates (Ia1.1), containing one or more of the carbodiimide structural units. Polyisocyanates (Ia1.1) of this kind are preferably of the formula Ia1.1.1

$$\text{OCN—(R}^c\text{—N=C=N)}_n\text{—R}^c\text{—NCO} \qquad \text{(Ia1.1.1)}$$

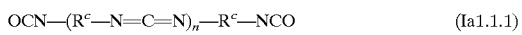

where
   $R^c$ is a divalent hydrocarbon radical with or without urea, urethane, ester and/or ether groups as is obtained by removing the isocyanate groups from a simple organic isocyanate or from a prepolymer which contains urethane groups and possibly ether or ester groups and which is terminated by isocyanate groups; if there are two or more radicals $R^c$ in the same molecule, then different radicals $R^c$ conforming to the given definition may be present simultaneously; and
   n is an integral or (on average) fractional number from 1 to 20, preferably from 2 to 10.

The carbodiimide structural units are introduced into the polyurethane (Ia) with particular preference by way of polyisocyanates of the formula Ia1.1.2

$$\text{O=C=N—R}^a(\text{—R}^b\text{—)}_m\text{N=C=O} \qquad \text{Ia1.1.2}$$

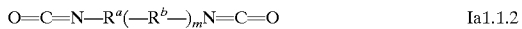

where
   $R^a$ is a group of the formula Ia1.1.2.1

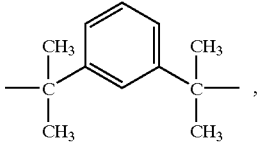

Ia1.1.2.1

$R^b$ is a group of the formula Ia1.1.2.2

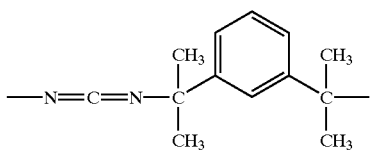

and
m is a number from 1 to 20.

In general, the polyurethanes (Ia) are otherwise built up from

Ia1) diisocyanates which
   Ia1.1) comprise carbodiimide structural units, with or without those which
   Ia1.2) are free of carbodiimide structural units,
Ia2) diols of which
   Ia2.1) from 10 to 100 mol %, based on the overall amount of the diols (b), have a molecular weight of from 500 to 5000, and
   Ia2.2) from 0 to 90 mol %, based on the overall amount of the diols (Ia2), have a molecular weight of from 60 to 500 g/mol,
Ia3) monomers other than the monomers (Ia1) and (Ia2), which have at least one isocyanate group or at least one isocyanate-reactive group and also carry at least one hydrophilic group or one potentially hydrophilic group which makes the polyurethanes dispersible in water,
Ia4) if desired, further, polyfunctional compounds which are different from the monomers (Ia1) to (Ia3) and have reactive groups which are alcoholic hydroxyl, primary or secondary amino or isocyanate groups, and
Ia5) if desired, monofunctional comounds which are different from the monomers (Ia1) to (Ia4) and have a reactive group which is an alcoholic hydroxyl, primary or secondary amino or isocyanate group.

Particularly suitable diisocyanatocarbodiimides (Ia1.1) are those of the formula Ia1.1.1 or Ia1.1.2.

The radicals $R^c$ in formula Ia1.1.1 are preferably derived by abstracting the isocyanate groups from monomers (Ia1.2), which are the diisocyanates commonly employed in polyurethane chemistry.

Monomers (Ia1.2) are, in particular, diisocyanates $X(NCO)_2$, where X is an aliphatic hydrocarbon radical of 4 to 12 carbons, a cycloalphiphatic or aromatic hydrocarbon radical of 6 to 15 carbons or an araliphatic hydrocarbon radical of 7 to 15 carbons. Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis-(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (EMDI), such as the trans/trans, the cis/cis and the cis/trans isomers, and mixtures of these compounds.

Radicals $R^c$ derived by abstracting the isocyanate groups from a prepolymer which contains urethane groups, possibly ether or ester groups and terminal isocyanate groups are those built up from the diols (Ia2) and the diisocyanates (Ia1.2).

The preparation of the monomers (Ia1.1) is known per se and is described, for example, in U.S. Pat. No. 2,840,589, U.S. Pat. No. 2,941,966, EP-A-628 541 and by P. W. Campbell and K. C. Smeltz in Journal of Organic Chemistry, 28, (1963) 2069. Diisocyanatocarbodiimides can also be prepared, in a particularly gentle process with no byproducts, by heterogeneous catalysis in accordance with DE-A 2 504 400 and 2 552 350. The carbodiimidization of diisocyanates in the presence of very small amounts of phospholine oxide and with subsequent blocking of the catalyst with acid chlorides is described in DE-A 2 653 120.

In addition to preparing the diisocyanates (Ia1.1), the diisocyanates (Ia1.2) are also generally employed directly to synthesize the polyurethanes which are present in polyurethane dispersions of the invention, since to synthesize the polyurethanes it is often necessary to have more isocyanate than is required to introduce the carbodiimide groups.

In addition to the abovementioned isocyanates, other isocyanates which can be employed as compounds (Ia1.2) to synthesize the polyurethanes are those which carry not only the free isocyanate groups but also further, blocked isocyanate groups, examples being uretdione groups.

With a view to good film formation and elasticity, compounds which are ideally suitable as diols (Ia2) are those diols (Ia2.1) which have a relatively high molecular weight of from about 500 to 5000, preferably from about 1000 to 3000 g/mol.

The diols (Ia2.1) are, in particular, polyester polyols which are known, for example, from Ullmanns Encyklop ädie der technischen Chemie, 4th Edition, Vol. 19, pp. 62 to 65. It is preferred to employ polyester polyols that are obtained by reacting dihydric alcohols with dibasic carboxylic acids. Instead of the free polycarboxylic acids it is also possible to use the corresponding polycarboxylic anhydrides or corresponding polycarboxylic esters of lower alcohols, or mixtures thereof, to prepare the polyester polyols. The polycarboxylic acids can be aliphatic, cycloaliphatic, araliphatic, aromatic or heterocyclic and can be unsubstituted or substituted, by halogen atoms, for example, and/or saturated or unsaturated. Examples are suberic, azelaic, phthalic and isophthalic acid, phthalic, tetrahydrophthalic, hexahydrophthalic, tetrachlorophthalic, endomethylenetetra-hydrophthalic, glutaric and maleic anhydride, maleic acid, fumaric acid and dimeric fatty acids. Preference is given to dicarboxylic acids of the formula HOOC—$(CH_2)_y$—COOH, where y is a number from 1 to 20, preferably an even number from 2 to 20, examples being succinic, adipic, sebacic and dodecanedicarboxylic acids.

Examples of suitable polyhydric alcohols are ethylene glycol, 1,2-propanediol, 1,3-propanediol, 1,3-butanediol, 1,4-butenediol, 1,4-butynediol, 1,5-pentanediol, neopentyl glycol, bis(hydroxymethyl)cyclohexanes such as 1,4-bis(hydroxymethyl)cyclohexane, 2-methyl-1,3-propanediol, methylpentanediols, and also diethylene glycol, triethylene glycol, tetraethylene glycol, polyethylene glycol, dipropylene glycol, polypropylene glycol, dibutylene glycol and polybutylene glycols. Preference is given to alcohols of the formula HO—$(CH_2)_x$—OH, where x is a number from 1 to 20, preferably an even number from 2 to 20. Examples of such alcohols are ethylene glycol, 1,4-butanediol, 1,6-hexanediol, 1,8-octanediol and 1,12-dodecanediol. Preference extends to neopentyl glycol.

Also suitable are polycarbonatediols, as can be obtained, for example, by reaction of phosgene with an excess of the low molecular mass alcohols cited as structural components for the polyester polyols.

Lactone-based polyesterdiols are also suitable, these being homopolymers or copolymers of lactones, preferably hydroxy-terminal adducts of lactones with suitable difunctional starter molecules. Suitable lactones are preferably those derived from compounds of the formula HO—(CH$_2$)$_z$—COOH, where z is from 1 to 20 and one hydrogen of a methylene unit can also be substituted by a C$_1$–C$_4$-alkyl. Examples are ε-caprolactone, β-propiolactone, γ-butyrolactone and/or methyl-ε-caprolactone, and mixtures thereof. Examples of suitable starter components are the low molecular mass dihydric alcohols cited above as structural components for the polyester polyols. The corresponding polymers of ε-caprolactone are particularly preferred. Lower polyesterdiols or polyetherdiols can also be employed as starters for preparing the lactone polymers. Instead of the polymers of lactones it is also possible to employ the corresponding, chemically equivalent polycondensates of the hydroxycarboxylic acids which correspond to the lactones.

Further suitable monomers (Ia2.1) are polyetherdiols. They are obtainable in particular by addition polymerization of ethylene oxide, propylene oxide, butylene oxide, tetrahydrofuran, styrene oxide or epichlorohydrin with itself, for example, in the presence of BF$_3$, or by addition reaction of these compounds, alone or in a mixture or in succession, onto starter components containing reactive hydrogens, such as alcohols or amines, examples being water, ethylene glycol, 1,2-propanediol, 1,3-propanediol, 1,2-bis(4-hydroxydiphenyl)propane or aniline. Particular preference is given to polytetrahydrofuran having a molecular weight of from 240 to 5000, and, in particular, from 500 to 4500.

Likewise suitable are polyhydroxyolefins, preferably those having 2 terminal hydroxyls, examples being a,ω-dihydroxypolybutadiene, a,ω-dihydroxypolymethacrylates or a,ω-dihydroxypolyacrylates as monomers (Ia2.1). Such compounds are known, for example, from EP-A-0622378. Further suitable polyols are polyacetals, polysiloxanes and alkyd resins.

The polyols can also be employed as mixtures in a proportion of from 0.1:1 to 1:9.

The hardness and the modulus of elasticity of the polyurethanes can be raised by employing as diols (Ia2) not only the diols (Ia2.1) but also low molecular mass diols (Ia2.2) having a molecular weight of from about 62 to 500, preferably from 62 to 200 g/mol.

Compounds employed as monomers (Ia2.2) are in particular the structural components cited as short-chain alkanediols for the preparation of polyester polyols, preference being given to the unbranched diols having 2, 4, 6, 8, 10 or 12 carbons and to 1,5-pentanediol and neopentyl glycol.

The proportion of diols (Ia2.1), based on the overall amount of diols (Ia2) is preferably from 10 to 100 mol %, and the proportion of monomers (Ia2.2), based on the overall amount of diols (Ia2), is from 0 to 90 mol %. With particular preference to ratio of the diols (Ia2.1) to the monomers (Ia2.2) is from 0.1:1 to 5:1, especially from 0.2:1 to 2:1.

In order to render the polyurethanes dispersible in water they are synthesized not only from components (Ia1) and (Ia2) but also from monomers (Ia3) which are different from components (Ia1) and (Ia2) and which carry at least one isocyanate group or at least one isocyanate-reactive group and, in addition, at least one hydrophilic group or a group which can be converted to a hydrophilic group. In the text below the term hydrophilic groups or potentially hydrophilic groups is shortened to (potentially) hydrophilic groups. The (potentially) hydrophilic groups react with isocyanates much more slowly than do the functional groups of the monomers used to build up the polymer main chain.

The proportion of components having (potentially) hydrophilic groups among the overall amount of components (Ia1), (Ia2), (Ia3), (Ia4) and (Ia5) is generally such that the molar amount of the (potentially) hydrophilic groups, based on the overall weight of all monomers (Ia1) to (Ia5), is from 30 to 1000, preferably from 50 to 500 and, with particular preference, from 80 to 300 mmol/kg.

The (potentially) hydrophilic groups can be nonionic or, preferably, (potentially) ionic hydrophilic groups.

Particularly suitable nonionic hydrophilic groups are especially poly(C$_1$–C$_4$-alkylene) glycol ethers made up of from preferably 5 to 100, more preferably from 10 to 80, repeating ethylene oxide units. The content of polyethylene oxide units is generally from 0 to 10, preferably from 0 to 6, % by weight, based on the overall weight of all monomers (Ia1) to (Ia5).

Preferred monomers having nonionic hydrophilic groups are polyethylene oxide diols, polyethylene oxide monools and the reaction products of a polyethylene glycol and a diisocyanate which carry a terminally etherified polyethylene glycol radical. Such diisocyanates and processes for their preparation are specified in the patents U.S. Pat. No. 3,905,929 and U.S. Pat. No. 3,920,598.

Ionic hydrophilic groups are, in particular, anionic groups, such as the sulfonate, carboxylate and phosphate groups in the form of their alkali metal salts or ammonium salts, and also cationic groups such as ammonium groups, especially protonated tertiary amino groups or quaternary ammonium groups.

Potentially ionic hydrophilic groups are, in particular, those which can be converted by simple neutralization or hydrolysis reactions into the abovementioned ionic hydrophilic groups, examples thus being carboxyl groups.

(Potentially) ionic monomers (Ia3) are described in detail in, for example, Ullmanns Encyklopädie der technischen Chemie, 4th Edition, Vol. 19, pp. 311–313 and, for example, in DE-A 14 95 745.

Monomers having tertiary amino groups, in particular, are of special practical importance as (potentially) cationic monomers (Ia3), examples being: tris(hydroxyalkyl)amines, N,N'-bis(hydroxyalkyl)alkylamines, N-hydroxyalkyl-dialkylamines, tris(aminoalkyl)amines, N,N'-bis(aminoalkyl)alkylamines, N-aminoalkyl-dialkylamines, the alkyls and alkanediyl units of these tertiary amines consisting independently of one another of 1 to 6 carbons.

These tertiary amines are converted either with acids, preferably strong mineral acids such as phosphoric acid, sulfuric acid or hydrohalic acids, or strong organic acids, or by reaction with appropriate quaternizing agents such as C$_1$–C$_6$-alkyl halides or benzyl halides, for example bromides or chlorides, into the ammonium salts.

Suitable monomers having (potentially) anionic groups are, conventionally, aliphatic, cycloaliphatic, araliphatic or aromatic carboxylic and sulfonic acids which carry at least one alcoholic hydroxyl or at least one primary or secondary amino group. Preference is given to dihydroxyalkylcarboxylic acids, especially those having 3 to 10 carbons, as are described, inter alia, in U.S. Pat. No. 3,412,054. Particular preference is given to compounds of the formula (Ia3.1)

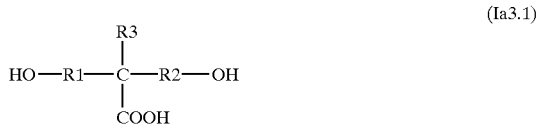

where R$^1$ and R$^2$ are C$_1$–C$_4$-alkanediyl and R$^3$ is C$_1$–C$_4$-alkyl, and especially to dimethylolpropianic acid (DMPA).

Corresponding dihydroxysulfonic and dihydroxyphosphonic acids, such as 2,3-dihydroxypropanephosphonic acid, are also suitable.

Compounds otherwise suitable are dihydroxy compounds having a molecular weight of more than 500 up to 10,000 g/mol and at least 2 carboxylate groups, which are known from DE-A 39 11 827. They are obtainable by reacting dihydroxy compounds with tetracarboxylic dianhydrides, such as pyromellitic dianhydride or cyclopentanetetracarboxylic dianhydride, in a molar ratio of from 2:1 to 1.05:1 in a polyaddition reaction. Particularly suitable dihydroxy compounds are the monomers (IIa2) listed as chain extenders, and the diols (IIa1).

Suitable monomers (Ia3) having isocyanate-reactive amino groups are amino carboxylic acids such as lysine, β-alanine or the adducts specified in DE-A-20 34 479 of aliphatic diprimary diamines with a,β-unsaturated carboxylic or sulfonic acids.

Such compounds conform for example to the formula (Ia3.2)

$$H_2N-R^4-NH-R^5-X \qquad (Ia3.2)$$

where

R$^4$ and R$^5$ independently of one another are a $C_1$–$C_6$-alkanediyl, preferably ethylene and X is COOH or SO$_3$H.

Particularly preferred compounds of the formula (IV) are

N-(2-aminoethyl)-2-aminoethanecarboxylic acid and

N-(2-aminoethyl)-2-aminoethanesulfonic acid and the corresponding alkali metal salts, Na being the particularly preferred counterion.

Also particularly preferred are the adducts of the abovementioned aliphatic diprimary diamines with 2-acrylamido-2-methylpropane sulfonic acid, as are described, for example, in DE-C 19 54 090.

Insofar as monomers having potentially ionic groups are employed their conversion to the ionic form can take place before or during, but preferably after, the isocyanate polyaddition reaction, since the solubility of the ionic monomers in the reaction mixture is in many cases poor. With particular preference, the sulfonate or carboxylate groups are in the form of their salts with an alkali metal ion or an ammonium ion as counterion.

Where use is made of monomers (Ia3) having carboxyl groups or groups which can be converted to carboxyl groups by hydrolysis reactions or protonation of carboxylate groups, following the dispersion of the polyurethanes, the pH of the aqueous dispersion of the invention is rendered basic such that there are essentially no longer any carboxyl groups but, instead, these groups have almost all been neutralized. This is generally the case at pH>>pK$_a$ where:

$$pH = pK_a - \log c_{acid}/c_{salt}.$$

The pH is preferably at least 8.

The monomers (Ia4), which are different from the monomers (Ia1) to (Ia3), serve generally for crosslinking or chain extension. They are generally non-phenolic alcohols with a functionality of more than two, amines having 2 or more primary and/or secondary amino groups, and compounds which in addition to one or more alcoholic hydroxyls carry one or more primary and/or secondary amino groups.

Examples of alcohols having a functionality of more than 2 which can be used to establish a certain degree of branching or crosslinking are trimethylolpropane, glycerol and sugar.

Also suitable are monoalcohols which in addition to the hydroxyl carry a further isocyanate-reactive group, such as monoalcohols having one or more primary and/or secondary amino groups, for example, monoethanolamine.

Polyamines having 2 or more primary and/or secondary amino groups are employed in particular when chain extension and/or crosslinking is to take place in the presence of water, since amines generally react more quickly with isocyanates than do alcohols or water. This is in many cases necessary when the desire is for aqueous dispersions of crosslinked polyurethanes, or polyurethanes of high molar weight. In such cases a procedure is followed in which prepolymers with isocyanate groups are prepared, are rapidly dispersed in water and then are subjected to chain extension or crosslinking by adding compounds having two or more isocyanate-reactive amino groups.

Amines suitable for this purpose are, in general, polyfunctional amines with a molar weight in the range from 32 to 500 g/mol, preferably from 60 to 300 g/mol, having at least two amino groups selected from the group consisting of primary and secondary amino groups. Examples are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane.

The amines can also be employed in block form, for example in the form of the corresponding ketimines (see eg. CA-A-1 129 128), ketazines (cf. eg. U.S. Pat. No. 4,269, 748) or amine salts (see U.S. Pat. No. 4,292,226). Oxazolidines as well, as are used, for example, in U.S. Pat. No. 4,192,937, are capped polyamines which can be employed to chain-extend the prepolymers in the preparation of the novel polyurethanes. When capped polyamines of this kind are used they are generally mixed with the prepolymers in the absence of water and this mixture is subsequently mixed with the dispersion water or with a portion thereof so that the corresponding polyamines are liberated by hydrolysis.

It is preferred to used mixtures of diamines and triamines, especially mixtures of isophoronediamine (IPDA) and diethylenetriamine (DETA).

The polyurethanes contain preferably from 1 to 30, especially from 4 to 25 mol %, based on the total amount of components (Ia2) and (Ia4), of a polyamine having at least 2 isocyanate-reactive amino groups, as monomers (d).

For the same purpose it is also possible, as monomers (Ia4), to employ isocyanates with a functionality of more than two. Examples of commercial compounds are the isocyanurate or the biuret of hexamethylene diisocyanate.

Monomers (Ia5), which can additionally be used if desired, are monoisocyanates, monoalcohols and monoprimary and monosecondary amines. In general their proportion is not more than 10 mol %, based on the overall molar amount of the monomers. These monofunctional compounds usually carry other functional groups, such as olefinic groups or carbonyl groups, and serve to introduce functional groups into the polyurethane which enable the polyurethane to be dispersed or crosslinked or to undergo further polymer-analogous reaction. Monomers suitable for this purpose are those such as isopropenyl-a,a-dimethylbenzyl isocyanate (TMI) and esters of acrylic or methacrylic acid, such as hydroxyethyl acrylate or hydroxyethyl methacrylate.

In the field of polyurethane chemistry it is generally known how the molecular weight of the polyurethanes can be adjusted by choosing the proportions of the co-reactive monomers and by the arithmetic mean of the number of reactive functional groups per molecule.

Components (Ia1) to (Ia5) and their respective molar amounts are normally chosen so that the ratio A:B, where A) is the molar amount of isocyanate groups and B) is the sum of the molar amount of the hydroxyls and the molar amount of the functional groups which are able to react with isocyanates in an addition reaction, is from 0.5:1 to 2:1, preferably from 0.8:1 to 1.5 and, with particular preference, from 0.9:1 to 1.2:1. With very particular preference the ratio A:B is as close as possible to 1:1.

The monomers (Ia1) to (Ia5) employed carry on average usually from 1.5 to 2.5, preferably from 1.9 to 2.1 and, with particular preference, 2.0 isocyanate groups and/or functional groups which are able to react with isocyanates in an addition reaction.

The polyaddition of components (Ia1) to (Ia5) takes place in general at from 20 to 180° C., preferably from 50 to 150° C., under atmospheric pressure or under autogenous pressure.

The reaction times required may extend from a few minutes to several hours. It is known in the field of polyurethane chemistry how the reaction time is influenced by a host of parameters such as temperature, monomer concentration and monomer reactivity.

The reaction of the diisocyanates can be accelerated using the customary catalysts, such as dibutyltin dilaurate, tin(II) octoate or diazabicyclo[2.2.2]octane.

Stirred vessels are suitable polymerization apparatus, especially when solvents are used to provide low viscosity and good heat dissipation.

Preferred solvents are of unlimited miscibility with water, have a boiling point from 40 to 100° C. under atmospheric pressure, and react slowly, if at all, with the monomers.

The dispersions are usually prepared by one of the following methods:

In the acetone process an ionic polyurethane is prepared from components (Ia1) to (Ia3) in a water-miscible solvent which boils at below 100° C. under atmospheric pressure. Water is added until a dispersion is formed in which water is the coherent phase.

The prepolymer mixing process differs from the acetone process in that rather than a fully reacted (potentially) ionic polyurethane it is a prepolymer carrying isocyanate groups which is prepared first of all. In this case the components are chosen such that the above-defined ratio A:B is greater than 1.0 to 3, preferably 1.05 to 1.5. The prepolymer is first dispersed in water and then crosslinked, possibly by reacting the isocyanate groups with amines which carry more than 2 isocyanate-reactive amino groups or in chain-extended with amines which carry 2 amino groups which are reactive toward isocyanates. Chain extension also takes place when no amine is added. In this case, isocyanate groups are hydrolyzed to amino groups, which react with residual isocyanate groups of the prepolymers and so extend the chain.

If a solvent has been used in preparing the polyurethane, it is usual to remove the majority of the solvent from the dispersion, for example by distillation under reduced pressure. The dispersions preferably have a solvent content of less than 10% by weight and are, with particular preference, free from solvents.

The dispersions generally have a solids content of from 10 to 75, preferably from 20 to 65, % by weight and a viscosity of from 10 to 500 mPa.s (measured at 20° C. and at a shear rate of 250 s$^{-1}$).

Hydrophobic auxiliaries, which in some cases are difficult to disperse homogeneously in the finished dispersion, examples being phenol condensation resins formed from aldehydes and phenol or phenol derivatives or epoxy resins and other polymers set out, for example, in DE-A-39 03 538, 43 09 079 and 40 24 567, and which are used, for example, as adhesion promoters in polyurethane dispersions, can be added to the polyurethane or to the prepolymer, prior to dispersion, in accordance with the methods described in the two abovementioned documents.

In one variant of the inventions, the hydrophilic polyurethane Ibi and a carbodiimide Ibii are present in the form of a physical mixture in the disperse phase P.I.

The polyurethane Ibi can have exactly the same composition as the polyurethane Ia except that the polyurethane Ibi carries no effective amounts of carbodiimide groups.

Correspondingly, the polyurethane Ibi is usually built up from

Ibi1) diisocyanates which are free from carbodiimide structural units,

Ibi2) diols of which

Ibi2.1) from 10 to 100 mol %, based on the overall amount of the diols (Ibi2), have a molecular weight of from 500 to 5000, and Ibi2.2) from 0 to 90 mol %, based on the overall amount of the diols (Ibi2), have a molecular weight of from 60 to 500 g/mol, Ibi3) monomers other than the monomers (Ibi1) and (Ibi2), which have at least one isocyanate group or at least one isocyanate-reactive group and also carry at least one hydrophilic group or one potentially hydrophilic group which makes the polyurethanes dispersible in water, Ibi4) if desired, further, polyfunctional compounds which are different from the monomers (Ibi1) to (Ibi3) and have reactive groups which are alcoholic hydroxyl, primary or secondary amino or isocyanate groups, and Ibi5) if desired, monofunctional compounds which are different from the monomers (Ibi1) to (Ibi4) and have a reactive group which is an alcoholic hydroxyl, primary or secondary amino or isocyanate group.

Particularly suitable structural components (Ibi1) are the compounds designated as (Ia1.2), as structural components (Ib2) those designated as (Ia2), as structural components (Ibi3) those designated as (Ia3), as structural components (Ibi4) those designated as (Ia4), and as structural components (Ibi5) those designated as (Ia5).

The carbodiimide Ibii carries essentially no hydrophilic groups which make it dispersible in water; that is, it carries essentially no ionic groups or hydrophilic polyalkylene oxide radicals, as are carried by the monomers Ia3 and Ibi3, respectively. Examples of suitable carbodiimides Ibii are those of the formula Ibii1

$$R^d(-R^c-N=C=N-R^c-)_m R^d \qquad \text{Ibii1}$$

where n is a number from 2 to 20

$R^c$ is as defined for the formula Ia1.1.1

$R^d$ is $-NH_2$ $$-NH-\overset{O}{\underset{\|}{C}}-NHR^e \qquad -NH-\overset{O}{\underset{\|}{C}}-NH^e_2$$

-continued

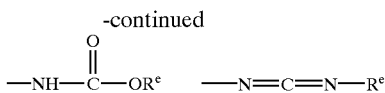

and $R^e$ independently at each occurrence is $C_1$- to $C_{20}$-alkyl, $C_5$- to $C_{12}$-cycloalkyl, $C_6$- to $C_{20}$-aryl or $C_7$- to $C_{20}$-aralkyl, it being possible for 1 to 4 hydrogen atoms of the radicals $R^e$ to be substituted by substituents which are inert with respect to carbodiimide groups.

Among these compounds, preference is given to those of the formulae Ibii2 and Ibii3

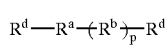

Ibii2 where $R^a$, $R^b$ and $R^d$ are as defined in the formulae Ia1.1.2 and Ibii1 and p is a number from 2 to 20;

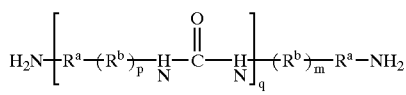

Ibii3 where $R^a$ and $R^b$ are as defined for the formula Ia1.12, p is a number from 2 to 20 and q is a number from 1 to 10.

The carbodiimides Ibii having terminal urea or urethane groups can be prepared, for example, by reacting compounds of the formula Ia1.1.1 with the corresponding alcohols or amines.

Compounds of this kind are known and are described, for example, in EP-A-628 541.

The carbodiimides Ibii having terminal groups of the type —N=C=N—$R^e$ are obtainable by condensing compounds of the formula Ia1.1.1 with the corresponding monoisocyanates or by cocondensing the diisocyanates from which the compounds of the formula Ia1.1.1. are composed conjointly with the monoisocyanates. Preference is given to phenyl isocyanate, cyclohexyl isocyanate or m-isopropenyl-alpha, alpha-dimethylbenzyl isocyanate (TMI).

The preparation of an aqueous dispersion containing a disperse phase I in which the polyurethane Ibi and the carbodiimide Ibii are present in the form of a physical mixture can be carried out, for example, as for the preparation of the polyurethanes Ia containing a hydrophobic auxiliary. This means that the carbodiimide Ibii, where it carries no isocyanate-reactive groups such as alcoholic hydroxyl or primary and secondary amino groups, can be added at any desired point in time to the reaction mixture from which the polyurethane Ibi is formed, with the proviso that the addition takes place before the polyurethane Ibi is dispersed in water. Where the carbodiimide Ibii does carry isocyanate-reactive groups, the addition does not take place until after the reaction mixture has fully reacted, i.e., when it contains virtually no further NCO groups.

It is also possible to use the monomers Ia1.1 instead of the carbodiimides Ibii, provided that their addition takes place after the reaction mixture comprising the monomers Ibi1 to Ibi5 has fully reacted. In this case, the isocyanate groups of the monomers Ia1.1 are consumed by reaction with water to form amino groups, and these amino groups may react with further isocyanate groups of further molecules of the monomers Ia1.1, forming urea groups and resulting in chain-extended molecules.

Polymers suitable as polymer (P), which is present in the disperse phase (P.II), are virtually all film-forming polymers which carry carboxyl groups.

Particular preference is given to those aqueous dispersions of the invention in which the phase (P.II) is formed essentially of IIa) a polyurethane (IIa) which carries carboxyl groups and essentially no carbodiimide groups, or IIb) a polymer (IIb) which is derived from
  IIb1) from 30 to 99.9% by weight of principal monomers selected from $C_1$–$C_{20}$-alkyl (meth)acrylates, vinyl esters of $C_1$–$C_{20}$ carboxylic acids, vinylaromatic compounds having up to 20 carbons, ethylenically unsaturated nitriles, vinyl halides and aliphatic hydrocarbons having 2 to 8 carbons and 1 or 2 double bonds,
  IIb2) from 0.01 to 20% by weight of a carboxylic acid having an olefinic double bond, and
  IIb3) free-radically polymerizable monomers other than (IIb1) and (IIb2), or IIc) water-dispersible polyester which carries carboxyl groups (polymer IIc).

In the context of the polymers (IIb), (meth)acryl- is an abbreviation for methacryl- or acryl-.

For the polymers P.II to form a disperse phase P.II, the polymers P.II generally have a solubility of less than 1 g/l in the coherent aqueous phase in the dispersion of the invention at a temperature of 25° C.

The polyurethanes (IIa) preferably contain from 0.01 to 1, more preferably from 0.1 to 0.5 mol, of carboxyl groups per kg of polyurethane (IIa). With particular preference, the number of carboxyl groups in polyurethane (IIa) and the number of carbodiimide structural units in polyurethane (Ia) are substantially equivalent.

The polyurethanes (IIa) are composed, generally and preferably, of

IIa1) diisocyanates which are free of carbodiimide structural units

IIa2) diols of which
  IIa2.1) from 10 to 100 mol %, based on the overall amount of the diols (IIa2), have a molecular weight of from 500 to 5000, and
  IIa2.2) from 0 to 90 mol %, based on the overall amount of the diols (IIa2), have a molecular weight of from 60 to 500 g/mol, IIa3) monomers other than the monomers (IIa1) and (IIa2), which have at least one isocyanate group or at least one isocyanate-reactive group and also carry at least one hydrophilic group or a potentially hydrophilic group which makes the polyurethanes dispersible in water, the hydrophilic group or potentially hydrophilic group of at least some of the monomers (IIa3) being a carboxyl group or a potential carboxyl group which is able, following dispersion of the polyurethane in an acidic aqueous medium, to react spontaneously to form a carboxyl group, IIa4) if desired, further, polyfunctional compounds which are different from monomers (IIa1) to (IIa2) and have reactive groups which are alcoholic hydroxyl, primary or secondary amino or isocyanate groups, and IIa5) if desired, monofunctional compounds which are different from monomers (IIa1) to (IIa4) and have a reactive group which is an alcoholic hydroxyl, primary or secondary amino or isocyanate group.

Suitable structural components (IIa1) are, in particular, the compounds designated as (Ia1.2), suitable structural components (IIa2) those designated as (Ia2), suitable structural components (IIa3) those designated as (Ia3), suitable structural components (IIa4) those designated as (Ia4), and suitable structural components (IIa5) those designated as (Ia5). Particularly suitable structural components (IIa1) are the compounds designated as (Ia1.2), as structural components (IIa2) those designated as (Ia2), as structural components (IIa3) those designated (Ia3), as structural components (IIa4) those designated (Ia4), and as structural components (IIa5) those designated as (Ia5). In the case of the structural components (IIa3), however, in contradistinction to those designated as (Ia3), there is the special feature that at least some of the monomers (IIa3) in the hydrophilic group or potentially hydrophilic group must be a carboxyl group or a potential carboxyl group which is able, following dispersion of the polyurethane in an aqueous medium, to react spontaneously to form a carboxyl group.

By potential carboxyl groups are meant, for example, the carboxylate groups which are present as salts and are at least partially protonated in water, as well as, for example, carboxylic anhydride groups, which are hydrolyzed in water. The desired ratio of carboxyl groups to carboxylates can be adjusted with particular simplicity, following dispersion, by specifically altering the pH of the dispersion, as is described in DE-A-4 300 162 for example, or by adding acid or alkali prior to dispersion and following the synthesis of the polyurethane (IIa).

Preference is given to those dispersions of the invention where the phase (P.I) is formed essentially of a polyurethane (Ia) in which the hydrophilic groups of the structural component (Ia3) are sulfonate groups and where the phase (P.II) is formed essentially of a polyurethane (IIa) in which the hydrophilic groups of the structural component (IIa3) comprise carboxyl groups in a mixture with sulfonate groups, some of which are in the form of their ammonium salts or alkali metal salts.

The polymers (IIb) are preferably composed of the following monomers.

Examples of monomers (IIb1) are $C_1$–$C_{10}$-alkyl (meth)acrylates, such as methyl methacrylate, methyl acrylate, n-butyl acrylate, ethyl acrylate and 2-ethylhexyl acrylate.

Mixtures of alkyl (meth)acrylates, in particular, are also suitable.

Examples of vinyl esters of carboxylic acids of 1 to 20 carbons are vinyl laurate, stearate, propionate and acetate.

Suitable vinylaromatic compounds are vinyltoluene, a- and p-methylstyrene, a-butylstyrene, 4-n-butylstyrene, 4-n-decylstyrene and, preferably styrene.

Examples of nitriles are acrylonitrile and methacrylonitrile.

The vinyl halides are chloro-, fluoro- or bromo-substituted ethylenically unsaturated compounds, preferably vinyl chloride and vinylidene chloride.

Nonaromatic hydrocarbons of 2 to 8 carbons and one or two olefinic double bonds include butadiene, isoprene and chloroprene, and also ethylene, propylene and isobutylene.

The principal monomers (IIb1) are also, preferably, employed in a mixture.

Vinylaromatic compounds such as styrene, for example, are frequently employed in a mixture with $C_1$–$C_{20}$-alkyl (meth)acrylates, especially $C_1$–$C_8$-alkyl (meth)acrylates, or with nonaromatic hydrocarbons such as isoprene, or, preferably, butadiene.

Suitable monomers (IIb2) are preferably (meth)acrylic acid or maleic acid.

Examples of suitable monomers (IIb3) are esters of acrylic and methacrylic acid with alcohols of 1 to 20 carbons, containing as well as the oxygen atom in the alcohol group at least one further heteroatom and/or containing an aliphatic or aromatic ring, such as 2-ethoxyethyl acrylate, 2-butoxyethyl (meth)acrylate, dimethylaminoethyl (meth)acrylate, diethylaminoethyl (meth)acrylate, aryl, alkaryl or cycloalkyl (meth)acrylates, such as cyclohexyl (meth)acrylate, phenylethyl (meth)acrylate, phenylpropyl (meth)acrylate or acrylic esters of heterocyolic alcohols, such as furfuryl (meth)acrylate.

Also suitable are monomers (IIb3) having amino groups or amide groups, such as (meth)acrylamide and their derivatives substituted on the nitrogen by $C_1$–$C_4$-alkyl.

Of particular importance as monomers (IIb3) are hydroxy-functional monomers, examples being $C_1$–$C_{15}$-alkyl(meth)acrylates substituted by one or two hydroxyls. Of particular importance as hydroxy-functional comonomers are $C_2$–$C_8$-hydroxyalkyl (meth)acrylates, such as n-hydroxyethyl, n-hydroxypropyl or n-hydroxybutyl (meth)acrylate.

The polymer (IIb) is prepared by free-radical polymerization. Appropriate methods of polymerization, such as bulk, solution, suspension or emulsion polymerization, are known to the skilled worker.

The copolymer is preferably prepared by solution polymerization with subsequent dispersion in water or, with particular preference, by emulsion polymerization.

In the case of emulsion polymerization the comonomers can be polymerized as usual in the presence of a water-soluble initiator and an emulsifier at preferably from 30 to 95° C.

Examples of suitable initiators are sodium, potassium and ammonium persulfate, tert-butyl hydroperoxides, water-soluble azo compounds, or redox initiators.

Examples of emulsifiers used are alkali metal salts of relatively long-chain fatty acids, alkyl sulfates, alkylsulfonates, alkylated arylsulfonates or alkylated biphenyl ether sulfonates. Further suitable emulsifiers are reaction products of alkylene oxides, especially ethylene or propylene oxide, with fatty alcohols or fatty acids or phenol or alkyl phenols.

In the case of aqueous secondary dispersions the copolymer is first prepared by a solution polymerization in an organic solvent and is then dispersed in water with the addition of salt formers such as ammonia to carboxyl-containing copolymers, without the use of an emulsifier or dispersing auxiliary. The organic solvent can be removed by distillation. The preparation of aqueous secondary dispersions is known to the skilled worker and is described, for example in DE-A-37 20 860.

To adjust the molecular weight it is possible to use regulators during the polymerization. Suitable examples are —SH-containing compounds, such as mercaptoethanol, mercaptopropanol, thiophenol, thioglycerol, ethyl thioglycolate, methyl thioglycolate and tert-dodecyl mercaptan. They can be employed, for example, in amounts of from 0 to 0.5% by weight, based on the copolymer.

The nature and amount of the comonomers are preferably chosen such that the resulting copolymer has a glass transition temperature of from −60 to +140° C., preferably from −60 to +100° C. The glass transition temperature of the copolymer is determined by differential thermal analysis or differential scanning calorimetry in accordance with ASTM 3418/82.

The number-average molecular weight $M_n$ is preferably from $10^3$ to $5·10^6$, with particular preference from $10^5$ to $2·10^6$ (determined by gel permeation chromatography with polystyrene as a standard).

The water-dispersible polyesters which carry carboxyl groups (polymer d) are known, for example, from Encyclopedia of polymer science and engineering, John Wiley & Sons, second edition, Volume 12, pages 300 to 313.

Suitable polyesters are those, for example, which are prepared from compounds of the formula (Ia3.1) and from the structural components of the polyesterpolyols which are used to synthesize the polyurethanes (Ia) (structural component a2.1).

The dispersions of the invention can be prepared in a particularly simple manner by preparing dispersions which contain, separately, the disperse phases (I) and (II) and subsequently mixing said dispersions with one another. Mixing is not critical and can be carried out, for example, by stirring one dispersion into the other. Mixing can be carried out at any point in time before the dispersions are used.

The polyurethane dispersions of the invention may include further water-emulsifiable or water-dispersible resins, such as polyurethanes, polyester, epoxy or alkyd resins, and customary commercial auxiliaries and additives, such as flow agents, defoamers, emulsifiers, thickeners and thixotropic agents, and colorants, such as dyes and pigments. The dispersions of the invention do not normally, however, contain any effective amounts of melamine, kaolin or flame retardant.

The dispersions are suitable, for example, for the adhesive bonding or coating of various substrates, such as wood, metal, plastics, paper, leather or textile, for the impregnation of textiles and for the production of moldings and printing inks.

In these contexts, the polyurethane dispersions of the invention can be processed by the techniques commonplace in the adhesives, leather or coatings industry; i.e., by spraying, rolling or knife-coating the dispersions onto the substrate and then drying them.

For the case of processing as an adhesive, the coated workpieces are joined to another workpiece, preferably with application of pressure, either before or after the dispersion film has dried.

Particularly strong adhesive bonds are obtained if workpieces that have been provided with a dried adhesive film are heated at from about 50 bis 100° C. directly before, during or after joining.

The adhesive bonds produced by these methods are particularly notable for their stability on storage and their high thermal stability.

Experimental Section
Abbreviations:

| P | parts |
|---|---|
| CDI | carbodiimide groups |
| OHN | hydroxyl number |
| TDI | tolylene diisocyanate |
| HDI | hexamethylene diisocyanate |
| DBTL | dibutylin dilaurate |
| DMPA | dimethylolprapionic acid |
| RT | room temperature |

In the examples, the carbodiimide of the following formula was used

$$OCN-(R^C-N=C=N)_n-R^C-NCO \qquad (Ia1.1.1)$$

where m is on average approximately 4.

The viscosities of the dispersions were measured at 20° C. and at a shear rate of 250 s$^{-1}$ using a rotational rheometer having concentric cylinders (spindle diameter 38.7 mm, cup diameter: 42.0 mm).

The particle size of the latex particles was determined indirectly by way of turbidity measurements. For this purpose, the turbidity of a dispersion with a solids content of 0.1% by weight was determined relative to distilled water at a path length of 2.5 cm and at room temperature.

$$LT = \frac{\text{intensity of disp.} \times 100}{\text{intensity of water}}$$

Determining the K value

The K value is a measure of the molecular weight of a polymer and was determined by the method described in Kirk-Othmer, Encyclopedia of Chemical Technology, 3rd Edition, John Wiley & Sons Inc., Volume 23, p.967.

A Preparing the dispersions
A1 Preparing the initial dispersions
A1.1 Preparing the initial dispersions of type (I)
A1.1.1 Preparing the initial dispersions of type (Ia)
Dispersions Ia1: Dispersions with carbodiimide 542.9 g of a polyester made from adipic acid, neopentyl glycol and hexanediol (OHN=56), 0.1 g of DBTL and 36.6 g of 1,4-butanediol in 92.2 g of acetone were reacted with 58.6 g of TDI at 65° C. for 1 h. Then, 88.3 g of an NCO-terminal carbodiimide with 8% NCO and 15% CDI in 100 g of acetone were added. After 10 minutes, 56.5 g of HDI were metered in and the mixture was stirred at 65° C. for 153 minutes. It was then diluted with 756 g of acetone and cooled to 50° C. The NCO content was 0.38%. Chain extension was carried out with 33.8 g of a 50% strength aqueous solution of sodium aminoethylaminoethanesulfonate, and the product was dispersed with 1200 g of deionized water. The acetone was distilled off under reduced pressure at temperatures up to 43° C., and the solids content was adjusted to 40%.

Analytical values: LT:69 visc.:32 mPas K value:51 pH:8.8

Dispersion Ia2: Dispersion with carbodiimide 563.2 g of a polyester made from adipic acid, neopentyl glycol and hexanediol (OHN=56), 0.1 g of DBTL and 38 g of 1,4-butanediol in 191.4 g of acetone were reacted with 63.4 g of TDI at 62° C. for 1 h. Then, 57.3 g of an NCO-terminal carbodiimide with 8% NCO and 15% CDI in 100 g of acetone were added. After 10 minutes, 61.2 g of HDI were metered in and the mixture was stirred at 65° C. for 139 minutes. It was then diluted with 756 g of acetone and cooled to 50° C. The NCO content was 0.41%. Chain extension was carried out with 33.8 g of a 50% strength solution of sodium aminoethylaminoethanesulfonate, and the product was dispersed with 1200 g of deionized water. The acetone was distilled off under reduced pressure at temperatures up to 43° C., and the solids content was adjusted to 50%.

Analytical values: LT:78 visc.:46 mPas K value:58 pH:8.3

Dispersion Ia3: Dispersions with carbodiimide 552.6 g of a polyester made from adipic acid, neopentyl glycol and hexandediol (OHN=56), 0.1 g of DBTL and 37.3 g of 1,4-butanediol in 191.4 g of acetone were reacted with 60.9 g of TDI at 65° C. for 1 h. Then, 73.5 g of an NCO-terminal carbodiimide with 8% NCO and 15% CDI in 100 g of acetone were added. After 10 minutes, 58.8 g of HDI were metered in and the mixture was stirred at 65° C. for 140 minutes. It was then diluted with 756 g of acetone and cooled to 50° C. The NCO content was 0.41%. Chain extension was carried out with 33.8 g of a 50% strength solution of sodium aminoethylaminoethanesulfonate, and the product was dispersed with 1200 g of deionized water. The acetone was distilled off under reduced pressure at temperatures up to 43° C., and the solids content was adjusted to 40%.

Analytical values: LT:80 visc.:50 mPas K value:53 pH:7.8

A1.1.2 Preparing the initial dispersions of type Ib

Dispersions Ib1

600.6 g of a polyester made from adipic acid, neopentyl glycol and hexanediol (OHZ≈56), 0.15 g of DBTL and 40.5 g of 1,4-butanediol in 191.4 g of acetone were reacted with 72.2 g of TDI at 69° C. for 1 h. Then 69.8 g of HDI were metered in and the mixture was stirred at 69° C. for 147 minutes. It was then diluted with 765.8 g of acetone and cooled to 50° C. The NCO content was 0.40%. Chain extension was carried out with 33.8 g of a 50% strength aqueous solution of sodium aminoethylaminoethanesulfonate, then 50 g of an NCO-terminal carbodiimide containing 8% NCO and 15% CDI in 100 g of acetone were added and the product was dispersed with 1200 g of deionized water. The acetone was distilled off under reduced pressure at temperatures up to 43° C. and the solids content was adjusted to 40%.

Analytical values: LT:84.5 visc.:29 mPas K value:62 pH:6.9

Dispersions Ib2

591.1 g of a polyester made from adipic acid, neopentyl glycol and hexanediol (OHZ=56), 0.25 g of DBTL and 39.9 g of 1,4-butanediol in 189.8 g of acetone were reacted with 74 g of TDI at 68° C. for 90 minutes. Then 71.5 g of HDI were metered in and the mixture was stirred at 68° C. for 104 minutes. It was then diluted with 759 g of acetone and cooled to 50° C. The NCO content was 0.54%. Chain extension was carried out with 47.3 g of a 50% strength aqueous solution of sodium aminoethylaminoethanesulfonate, then 80 g of an NCO-terminal carbodiimide containing 8% NCO and 15% CDI in 100 g of acetone were added and the product was dispersed with 1200 g of deionized water. The acetone was distilled off under reduced pressure at temperatures up to 43° C. and the solids content was adjusted to 40%.

Analytical values: LT:86.7 visc.:38.6 mPas K value:58 pH:6.9

Dispersions Ib3

600.6 g of a polyester made from adipic acid, neopentyl glycol and hexanediol (OHz=56), 0.25 g of DBTL and 40.5 g of 1,4-butanediol in 191.4 g of acetone were reacted with 72.2 g of TDI at 65° C. for 90 minutes. Then 69.8 g of HDI were metered in and the mixture was stirred at 65° C. for 77 minutes. It was then diluted with 765 g of acetone and cooled to 50° C. The NCO content was 0.48%. Chain extensions was carried out with 33.8 g of a 50% strength aqueous solution of sodium aminoethylaminoethanesulfonate, then 30 g of an NCO-terminal carbodiimide containing 8% NCO and 15% CDI in 100 g of acetone were added and the product was dispersed with 1200 g of deionized water. The acetone was distilled off under reduced pressure at temperatures up to 43° C. and the solids content was adjusted to 40%.

Analytical values: LT:82 visc.:32.6 mPas K value:55 pH:7.5

Dispersion C.1 (for comparison): Dispersion with carbodiimide after dispersing before distillation 600.6 g of a polyester made from adipic acid, neopentyl glycol and hexanediol (OHN=56), 0.15 g of DBTL and 40.5 g of 1,4-butanediol in 91.4 g of acetone were reacted with 72.2 g of TDI at 69° C. for 1 h. Then, 69.8 g of HDI were metered in and the mixture was stirred at 65° C. for 199 minutes, during which it was diluted with 100 g of acetone. It was then diluted with 765.8 g of acetone and cooled to 50° C. The NCO content was 0.41%. Chain extension was carried out with 33.8 g of a 50% strength solution of sodium aminoethylaminoethanesulfonate, and the product was dispersed with 1200 g of deionized water. Then, 50 g of an NCO-terminal carbodiimide with 8% NCO and 15% CDI in 100 g of acetone were added. The acetone was distilled off under reduced pressure at temperatures up to 43° C., and the solids content was adjusted to 40%.

Analytical values: LT:73.4 visc.:25 mPas K value:59 pH:7.0

A1.2 Preparing the initial dispersions of type (II)

Dispersion IIa1: Dispersions with carboxylic acid 515.5 g of a polyester made from adipic acid, neopentyl glycol and hexanediol (OHN=56), 0.5 g of DBTL, 34.5 g of DMPA and 34.8 g of 1,4-butanediol in 187.3 g of acetone were reacted with 92.3 g of TDI at 65° C. for 1 h. Then, 89.2 g of HDI were added and the mixture was stirred at 65° C. for 177 minutes. It was then diluted with 749.3 g of acetone and cooled to 30° C. The NCO content was 0.91%. Chain extension was carried out with 67.6 g of a 50% strength solution of sodium aminoethylaminoethanesulfonate, and the product was dispersed with 1200 g of deionized water. The acetone was distilled off under reduced pressure at temperatures up to 43° C., and the solids content was adjusted to 40%.

Analytical values: LT:84 visc.:179 mPas K value:40 pH:5.9

Dispersion IIb1:

Dispersion made from butyl acrylate, acrylonitrile and acrylic acid, having the trade name Acronal® A 378.

A1.3 Preparing a prior-art dispersion, type 3 with neither carboxyl nor carbodiimide groups Dispersion C.2 without carbodiimide and without DMPA 588.7 g of a polyester made from adipic acid, neopentyl glycol and hexanediol (OHN=56), 0.1 g of DBTL and 39.7 g of 1,4-butanediol in 189.7 g of acetone were reacted with 74.4 g of TDI at 65° C. for 1 h. Then, 71.9 g of HDI were added and the mixture was stirred at 65° C. for 155 minutes. It was then diluted with 757.5 g of acetone and cooled to 30° C. The NCO content was 0.65%. Chain extension was carried out with 50.7 g of a 50% strength solution of sodium aminoethylaminoethanesulfonate, and the product was dispersed with 1200 g of deionized water. The acetone was distilled off under reduced pressure at temperatures up to 43° C., and the solids content was adjusted to 40%.

Analytical values: LT:67 visc.:27 mPas K value:52.2 pH:7.9

A.2 Preparing the latent-crosslinking dispersions and the comparative examples The dispersions were used for hardboard/PVC bonding, and the heat stability was determined.

Dispersion Ia1–IIa1.: 50 p of dispersion Ia1 were mixed with 50 p of dispersion IIa1.

Dispersion Ia1–IIa1: 50 p of dispersion Ia2 were mixed with 50 p of dispersion IIa1.

Dispersion Ia2–IIb2: 45 p of dispersion Ia2 were mixed with 60 p of dispersion IIb1.

Dispersion Ia3–IIa1: 50 p of dispersion Ia3 were mixed with 50 p of dispersion IIa1.

Dispersion Ib1–IIa1: 250 p of dispersion I.1 were mixed with 298 p of dispersion IIa1.

Dispersion Ib2–IIa1: 250 p of dispersion Ib2w were mixed with 297.4 p of dispersion IIa1

Example C.1-IIa1(c): I.4 were mixed with 299 p of dispersion IIa1.

Dispersion C.2-isocyanate: Dispersion III.1 was admixed with 7.5% of Desmodur® DA, an aliphatic polyisocyanate.

B. Conducting the performance tests

Static peel strength under hot conditions—hardboard/flexible PVC

The dispersions were thickened to about 300 mPas using Collacral VL®.

B.1 Preparing the test specimens

The tests were carried out with the following test specification:

Substrate: Hardboard panel/PVC sheet, type: Benecke 577/E28
Dimensions: 200×200 mm
Bond area: 200×170 mm (divided into 5 test strips of 30 mm each)
Application: 2 mm wire coating bar to hardboard panel in lengthwise direction
Drying: 3 min at 60° C.
Bonding technique: Hot pressing at 80° C., PVC side only
Pressing pressure: 0.1 N/mm²
Pressing time: 30 s
Sample storage: 1 day at RT
Test load: 300 g per 30 mm wide test strip
Peel angle: 180°
Number of samples: 1 panel=5 samples B.2 Load testing and evaluation The tests were carried out in accordance with the following test specification Following application of the adhesive, drying and pressing, the surface produced was cut into 30 mm wide strips with a space of 10 mm in between. When cutting, only the sheet is separated, with the hardboard panel remaining undamaged. The 10 mm wide in-between strips are removed and a 300 g weight is clamped to each of the 30 mm wide test strips.

Testing begins at 40° C. The temperature is raised by 10° C. at 30-minute intervals. During the heating phase, which lasts 15 minutes, the test strips are not subjected to loading.
Assessment of the aspect at fracture:
Co=Separation in the adhesive film without detachment from one material (cohesive fracture)

C Test results

The test results are summarized in Table 1

TABLE 1

| Dispersion | HS [° C] | Aspect at fracture |
|---|---|---|
| Ia1-IIa1 | 5 × >120 | Co |
| Ia2-IIa1 | 5 × >120 | Co |
| Ia2-IIb1 | 1 × 80, 4 × >120 | Co |
| Ia3-IIa1 | 5 × >120 | Co |
| Ib1-IIa1 | 5 × >120 | Co |
| Ib2-IIa1 | 5 × >120 | Co |
| Ia1 (C) | 5 × 70 | Co |
| Ia2 (C) | 5 × 90 | Co |
| Ia3 (C) | 5 × 80 | Co |
| Ib1 (C) | 5 × 90 | Co |
| Ib2 (C) | 4 × 90, 1 × 100 | Co |
| Ib3 (C) | 5 × 100 | Co |
| C.1 (C) | 5 × 90 | Co |
| IIa1 (C) | 5 × <50 | Co |
| C.1-IIa1 (C) | 5 × 100 | Co |
| C.2 (C) | 5 × <90° C. | Co |
| C.2 + Isocyanate (C) | 5 × 120° C. | Co |

"C" denotes comparative experiment
HS denotes heat stability

We claim:

1. A latent-crosslinking aqueous polyurethane dispersion comprising
I) a disperse phase (P.I) comprising
Ia) a polyurethane (Ia) which carries carbodiimide groups in addition to the hydrophilic groups which make it dispersible in water but carries essentially no carboxyl groups, which polyurethane is composed of diisocyanates, which comprise carbodiimide structural units, diols of which from 10 to 100 mol %, based on the overall amount of the diols, have a molecular weight of from 500 to 5000 g/mol, and from 0 to 90 mol %, based on the overall amount of the diols, have a molecular weight of from 60 to 500 g/mol or
Ib) a physical mixture of
Ibi) a polyurethane (Ibi) which carries hydrophilic groups which make it dispersible in water but carries essentially no carbodiimide or carboxyl groups and
Ibii) a carbodiimide (Ibii) which carries essentially no hydrophilic groups which make is dispersible in water, and
II) a disperse phase (P.II) comprising another polymer (II) which carries carboxyl groups and essentially no carbodiimide groups.

2. An aqueous dispersion as claimed in claim 1, where the carbodiimide structural units are incorporated into the polyurethane (Ia) by way of polyisocyanates (Ia1) of the formula Ia1.1.1

$$OCN-(R^c-N=C=N)_n-R^c-NCO \tag{Ia1.1.1}$$

where $R^3$ is a divalent hydrocarbon radical with or without urea, urethane, ester and/or ether groups as is obtained by removing the isocyanate groups from a simple organic isocyanate or from a prepolymer which contains urethane groups and possibly ether or ester groups and which is terminated by isocyanate groups; if there are two or more radicals $R^c$ in the same molecule, then different radicals $R^c$ conforming to the given definition may be present simultaneously; and
n is an integral or (on average) fractional number from 1 to 20.

3. An aqueous dispersion as claimed in claim 1, where the carbodiimide structural units are incorporated into the polyurethane (Ia) by way of polyisocyanates (Ia1) of the formula Ia1.1.2

$$O=C=N-R^a-(R^b)_m-N=C=O \tag{Ia1.1.2}$$

where
$R^a$ is a group of the formula Ia1.1.2.1

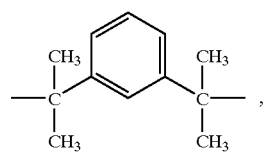

$R^b$ is a group of the formula Ia1.1.2.2

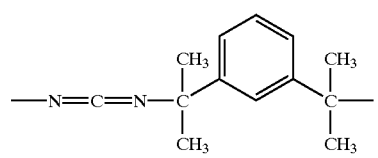

and m is a number from 1 to 20.

4. An aqueous dispersion as claimed in claim 1, where the phase (P.I) is formed essentially of a polyurethane (Ia) which is composed of
Ia1) diisocyanates which
Ia1.1) comprise carbodiimide structural units, with or without those which
Ia1.2) are free of carbodiimide structural units,
Ia2) diols of which
Ia2.1) from 10 to 100 mol %, based on the overall amount of the diols (Ia2), have a molecular weight of from 500 to 5000, and Ia2.2) from 0 to 90 mol %, based on the overall amount of the diols (Ia2), have a molecular weight of from 60 to 500 g/mol, Ia3) monomers other than the monomers (Ia1) and (Ia2), which have at least one isocyanate group or at least one isocyanate-reactive group and also carry at least one hydrophilic groups or a potentially hydrophilic group which makes the polyurethanes dispersible in water, Ia4) if desired, further polyfunctional compounds which are different from monomers (Ia1) to (Ia3) and have reactive groups which are alcoholic hydroxyl, primary or secondary amino or isocyanate groups, and Ia5) if desired, monofunctional compounds which are different from monomers (Ia1) to (Ia4) and have a reactive group which is an alcoholic hydroxyl, primary or secondary amino or isocyanate group.

5. An aqueous dispersion as claimed in claim 1, where the polyurethane (Ibi) is composed of Ibi1) diisocyanates which are free of carbodiimide structural units, Ibi2) diols of which
Ibi2.1) from 10 to 100 mol %, based on the overall amount of the diols (Ibi2), have a molecular weight of from 500 to 5000, and
Ibi2.2) from 0 to 90 mol %, based on the overall amount of the diols (Ibi2), have a molecular weight of from 60 to 500 g/mol, Ibi3) monomers other than the monomers (Ibi1) and (Ibi2), which have at least one isocyanate group or at least one isocyanate-reactive group and also carry at least one hydrophilic group or a potentially hydrophilic group which makes the polyurethanes dispersible in water, Ibi4) if desired, further polyfunctional compounds which are different from monomers (Ibi1) to (Ibi3) and have reactive groups which are alcoholic hydroxyl, primary or secondary amino or isocyanate groups, and Ibi5) if desired, monofunctional compounds which are different from monomers (Ibi1) to (Ibi4) and have a reactive group which is an alcoholic hydroxyl, primary or secondary amino or isocyanate group.

6. An aqueous dispersion as claimed in claim 1, where the carbodiimide Ibii is of the formula Ibii1

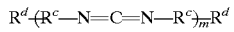   Ibii1 where n is a number from 2 to 20

$R^c$ is as defined for the formula Ia1.1.1

$R^d$ is —NH$_2$

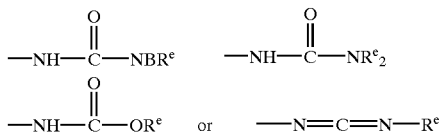

and $R^e$ independently at each occurrence is $C_1$-to $C_{20}$-alkyl, $C_5$-to $C_{12}$-cycloalkyl, $C_6$-to $C_{20}$-aryl or $C_7$-to $C_{20}$-aralkyl, it being possible for 1 to 4 hydrogen atoms of the radicals $R^e$ to be substituted by substituents which are inert with respect to carbodiimide groups.

7. An aqueous dispersion as claimed in claim 1, where the phase (PII) is formed essentially of IIa) a polyurethane (ITa) which carries carboxyl groups and essentially no carbodiimide groups, or IIb) a polymer (IIb) which is derived from
IIb1) from 30 to 99.9% by weight of principal monomers selected from $C_1$–$C_{20}$-alkyl (meth)acrylates, vinyl esters of $C_1$–$C_{20}$ carboxylic acids, vinylaromatic compounds having up to 20 carbons, ethylenically unsaturated nitriles, vinyl halides and aliphatic hydrocarbons having 2 to 8 carbons and 1 or 2 double bonds,
IIb2) from 0.01 to 20% by weight of a carboxylic acid having an olefinic double bond, and
IIb3) free-radically polymerizable monomers other than (c1) and (IIb2).
or IIc) water-dispersible polyester which carries carboxyl groups (polymer IIc).

8. An aqueous dispersion as claimed in claim 7, where the polyurethane (IIa) is composed of IIa1) diisocyanates which are free of carbodiimide structural units IIa2) diols of which
(IIa2.1) from 10 to 100 mol %, based on the overall amount of the diols (IIa2), have a molecular weight of from 500 to 5000, and
(IIa2.2) from 0 to 90 mol %, based on the overall amount of the diols (IIa2), have a molecular weight of from 500 to 5000, and IIa3) monomers other than the monomers (IIa1) and (IIa2), which have at least one isocyanate group or at least one isocyanate-reactive group and also carry at least one hydrophilic group or a potentially hydrophilic group which makes the polyurethanes dispersible in water, the hydrophilic group or potentially hydrophilic group at least some of the monomers (IIa3) being a carboxyl group or a potential carboxyl group, IIa4) if desired, further polyfunctional compounds which are different from monomers (IIa1) to (IIa2) and have reactive groups which are alcoholic hydroxyl, primary or secondary amino or isocyanate groups, and IIa5) if desired, monofunctional compounds which are different from monomers (IIa1) to (IIa2) and have a reactive group which is an alcoholic hydroxyl, primary or secondary amino or isocyanate group.

9. An aqueous dispersion as claimed in claim 1, where phase (P.I) is formed essentially of a polyurethane Ia or Ibi whose structural component Ia3 of Ibi3 carries sulfonate groups and where the phase (P.II) is formed essentially of a polyurethane (IIa) whose structural component (IIa3) carries carboxyl groups, some of which are present in the form of their ammonium salts or alkali metal salts.

10. An aqueous dispersion as claimed in claim 1, where the phase (P.II) is essentially formed of a polymer (IIb) which is derived from $C_1$–$C_{20}$-alkyl (meth)acrylates with or without acrylonitrile as monomers (IIb1) and (meth)acrylic acid as monomer (IIb2).

11. A method comprising adhesively bonding, impregnating or coating an article with the dispersion as claimed in claim 1.

12. An article made of wood, metal, textile, leather or plastic, adhesively bonded, impregnated or coated with an aqueous dispersion as claimed in claim 1.

13. An aqueous dispersion as claimed in claim 6, where the carbodiimide Ibii1 is of the formula Ibii2 or Ibii3

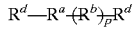   Ibii2 where $R^1$, $R^b$ and $R^d$ are as defined in the formulae Ia1.1.2 and Ibii1 and p is a number from 2 to 20 or of the formula Ibii3

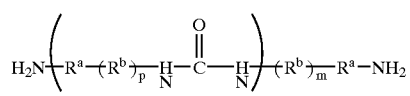

Ibii3 where Ra and Rb are as defined for formula Ia1.1.2, p is a number from 2 to 20 and q is a number from 1 to 10.

14. An aqueous dispersion as claimed in claim 2, wherein n is an integral or (on average) fractional number from 2 to 10.

15. An aqueous dispersion as claimed in claim 1, wherein polyurethane Ia comprises diols of which from 10 to 100 mol % based on the overall amount of the diols have a molecular weight from 1,000 to 3,000 g/mol.

* * * * *